US012738575B2

(12) United States Patent
Lim et al.

(10) Patent No.: US 12,738,575 B2
(45) **Date of Patent: *Sep. 15, 2026**

(54) PACKAGING FOR FLEXIBLE SECONDARY BATTERY AND FLEXIBLE SECONDARY BATTERY COMPRISING THE SAME

(71) Applicant: LG Chem, Ltd., Seoul (KR)

(72) Inventors: Joonwon Lim, Daejeon (KR); Yo-Han Kwon, Daejeon (KR); In-Sung Uhm, Daejeon (KR); Jae-Hyun Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 874 days.

This patent is subject to a terminal disclaimer.

(21) Appl. No.: 15/734,836

(22) PCT Filed: Oct. 21, 2019

(86) PCT No.: PCT/KR2019/013846
§ 371 (c)(1),
(2) Date: Dec. 3, 2020

(87) PCT Pub. No.: WO2020/080918
PCT Pub. Date: Apr. 23, 2020

(65) Prior Publication Data

US 2021/0234217 A1 Jul. 29, 2021

(30) Foreign Application Priority Data

Oct. 19, 2018 (KR) ........................ 10-2018-0125543

(51) Int. Cl.
*H01M 50/126* (2021.01)
*H01M 50/10* (2021.01)
(Continued)

(52) U.S. Cl.
CPC ......... *H01M 50/126* (2021.01); *H01M 50/10* (2021.01); *H01M 50/107* (2021.01);
(Continued)

(58) Field of Classification Search
None
See application file for complete search history.

(56) References Cited

U.S. PATENT DOCUMENTS 10,756,311 B2 8/2020 Tajima
2005/0095379 A1 5/2005 Hayakawa et al.
(Continued)

FOREIGN PATENT DOCUMENTS

CN 104396043 A 3/2015
CN 204632774 U 9/2015
(Continued)

OTHER PUBLICATIONS

Machine translation of JP-2014136653-A.*
(Continued)

*Primary Examiner* — Haixia Zhang
(74) *Attorney, Agent, or Firm* — Lerner David LLP

(57) ABSTRACT

A packaging for a flexible secondary battery improves the vapor barrier performance and flexibility of the flexible secondary battery. The packaging is in a shape of a tube that is wrapped around an outer surface of an electrode assembly, and includes a mechanical support layer; a reduced graphene oxide layer disposed on the mechanical support layer and including a plurality of reduced graphene oxide sheets; a heat shrink layer disposed on the reduced graphene oxide layer; and a sealant layer disposed on the heat shrink layer, wherein the plurality of reduced graphene oxide sheets in the reduced graphene oxide layer forms electrostatic interaction
(Continued)

between adjacent sheets of the plurality of reduced graphene oxide sheets. A flexible secondary battery including the packaging is also provided.

12 Claims, 6 Drawing Sheets

(51) Int. Cl.

| | |
|---|---|
| ***H01M 50/107*** | (2021.01) |
| ***H01M 50/117*** | (2021.01) |
| ***H01M 50/131*** | (2021.01) |
| ***H01M 50/183*** | (2021.01) |

(52) U.S. Cl.

CPC ....... *H01M 50/117* (2021.01); *H01M 50/131* (2021.01); *H01M 50/183* (2021.01)

(56) References Cited

U.S. PATENT DOCUMENTS

| | | | |
|---|---|---|---|
| 2013/0157022 | A1 | 6/2013 | Kim et al. |
| 2014/0335391 | A1 | 11/2014 | Kwon et al. |
| 2016/0272575 | A1 | 9/2016 | Zheng |
| 2016/0293907 | A1 * | 10/2016 | Chen .................... H01M 50/24 |
| 2016/0329533 | A1 | 11/2016 | Tajima |
| 2017/0025229 | A1 | 1/2017 | Kim et al. |
| 2017/0025645 | A1 | 1/2017 | Kwon et al. |
| 2017/0106342 | A1 | 4/2017 | Raveendran-Nair et al. |
| 2017/0141361 | A1 | 5/2017 | Shon et al. |
| 2017/0256817 | A1 | 9/2017 | Kadoma et al. |

FOREIGN PATENT DOCUMENTS

| | | | | |
|---|---|---|---|---|
| CN | 106165142 | A | | 11/2016 |
| CN | 106373999 | A | | 2/2017 |
| CN | 106495137 | A | | 3/2017 |
| CN | 207572409 | U | | 7/2018 |
| JP | 2012054221 | A | | 3/2012 |
| JP | 2013189614 | A | | 9/2013 |
| JP | 2013222555 | A | | 10/2013 |
| JP | 2014136653 | A | * | 7/2014 |
| JP | 2016213190 | A | | 12/2016 |
| KR | 20040070285 | A | | 8/2004 |
| KR | 20110115539 | A | | 10/2011 |
| KR | 20120105380 | A | | 9/2012 |
| KR | 20130068908 | A | | 6/2013 |
| KR | 20140128899 | A | | 11/2014 |
| KR | 20150050971 | A | | 5/2015 |
| KR | 20170057673 | A | | 5/2017 |
| KR | 20180049810 | A | | 5/2018 |
| WO | 2016178117 | A1 | | 11/2016 |

OTHER PUBLICATIONS

Extended European Search Report for Application No. 19873271.1, dated Aug. 25, 2021, 9 pages.

International Search Report for PCT/KR2019/013846 mailed Jan. 22, 2020; 2 pages.

Su Y, Kravets VG, Wong SL, Waters J, Geim AK, Nair RR. Impermeable barrier films and protective coatings based on reduced graphene oxide. Nature communications. Sep. 11, 2014;5(1):1-5.

Search Report dated Jul. 20, 2022 from the Office Action for Chinese Application No. 201980044167.9 issued Jul. 27, 2022, 3 pages.

* cited by examiner

PRIOR ART

PACKAGING FOR FLEXIBLE SECONDARY BATTERY AND FLEXIBLE SECONDARY BATTERY COMPRISING THE SAME

CROSS-REFERENCE TO RELATED APPLICATIONS

The present application is a national phase entry under 35 U.S.C. § 371 of International Application No. PCT/KR2019/013846, filed on Oct. 21, 2019, which claims the benefit of Korean Patent Application No. 10-2018-0125543 filed on Oct. 19, 2018 with the Korean Intellectual Property Office, the disclosures of which are incorporated herein by reference in their entireties.

TECHNICAL FIELD

The present disclosure relates to a packaging for a flexible secondary battery and a flexible secondary battery comprising the same.

BACKGROUND ART

Secondary batteries are designed to convert external electrical energy in the form of chemical energy and stores it, and when necessary, produce electricity. Since they can be charged many times, they are also known as "rechargeable batteries". Commonly used secondary batteries include lead-acid batteries, NiCd batteries, NiMH batteries, Li-ion batteries and Li-ion polymer batteries. Secondary batteries provide both economical and environmental advantages, compared to disposable primary batteries.

Secondary batteries are currently used in low power applications. For example, the range of applications may include devices that help starting a car, mobile devices, tools and uninterruptible energy systems. Recently, development of wireless communication technology leads to the widespread use of mobile devices, and with a tendency to wirelessize many types of existing devices, the demand for secondary batteries is dramatically increasing. Additionally, in keeping with environmental pollution prevention, the use of hybrid electric vehicles and electric vehicles is widespread, and these next-generation vehicles adopt technology to reduce the price and weight and increase the life using secondary batteries.

Known types of secondary batteries are cylindrical, prismatic and pouch-type secondary batteries, and recently, flexible secondary batteries featuring flexibility have been suggested, including a flexible secondary battery having a very high ratio of length to cross sectional diameter.

FIG. 1 is a diagram showing the structure of an embodiment of a general flexible secondary battery. As shown in FIG. 1, the flexible secondary battery 50 includes a negative electrode 10 wound in the shape of a coil, a separator 20 formed in a cylindrical shape having the negative electrode 10 provided on the inner side thereof, and wrapped around the outer surface of the negative electrode 10, a positive electrode 30 provided on the outer surface of the separator 20, and a packaging 40 formed in a cylindrical shape having the positive electrode 30 provided on the inner side thereof. That is, the flexible secondary battery 50 is manufactured by winding the separator 20, the positive electrode 30 and the packaging 40 in that order on the outer surface of the negative electrode 10 in the shape of a coil. As such, the flexible secondary battery 50 may be formed in the shape of a cable to allow it to bend, and may further include a heat shrinkable tube that is wrapped around the outer surface of the electrode assembly.

In general, the heat shrinkable tube is primarily made using a polymer material. The polymer is made in a porous form due to the structural feature thereof, so there is a problem with ingress of vapor and air into the battery. The vapor ingress into the battery is a major factor that causes battery performance degradation by reaction with water in an electrolyte solution using $LiPF_6$ as a lithium salt.

DISCLOSURE

Technical Problem

Therefore, the present disclosure is aimed at improving the vapor barrier property of a film for packaging a flexible secondary battery.

In addition, the present disclosure is aimed at improving not only the vapor barrier property but also flexibility of the film for packaging a flexible secondary battery.

Further, the present disclosure is aimed at providing a flexible secondary battery comprising the film for packaging a flexible secondary battery with improved vapor barrier property and flexibility.

Technical Solution

In a first embodiment of the present disclosure, there is provided a packaging for a flexible secondary battery configured to be disposed around an outer surface of an electrode assembly of the flexible secondary battery, including a mechanical support layer; a reduced graphene oxide layer disposed on the mechanical support layer and including a plurality of reduced graphene oxide sheets; a heat shrink layer disposed on the reduced graphene oxide layer; and a sealant layer disposed on the heat shrink layer, wherein the plurality of reduced graphene oxide sheets in the reduced graphene oxide layer forms electrostatic interaction between adjacent sheets of the plurality of reduced graphene oxide sheets.

In a second embodiment of the present disclosure, there is provided a packaging for a flexible secondary battery configured to be disposed around an outer surface of an electrode assembly of the flexible secondary battery, including a heat shrink layer; a reduced graphene oxide layer disposed on the heat shrink layer and including a plurality of reduced graphene oxide sheets; and a sealant layer disposed on the reduced graphene oxide layer, wherein the plurality of reduced graphene oxide sheets in the reduced graphene oxide layer form electrostatic interaction between adjacent sheets of the plurality of reduced graphene oxide sheets.

In a third embodiment of the present disclosure, there is provided the packaging for a flexible secondary battery as defined in the first or second embodiment, wherein each sheet of the plurality of reduced graphene oxide sheets has a structure of one to three layers of reduced graphene oxide particles.

In a fourth embodiment of the present disclosure, there is provided the packaging for a flexible secondary battery as defined in any one of the first to third embodiments, wherein each sheet of the plurality of reduced graphene oxide sheets has a thickness ranging from 0.002 to 10 μm.

In a fifth embodiment of the present disclosure, there is provided the packaging for a flexible secondary battery as defined in any one of the first to fourth embodiments, wherein each sheet of the plurality of reduced graphene oxide sheets forms electrostatic interaction between an adjacent sheet of the plurality of reduced graphene oxide sheets by at least one of $Li^{+}$, $K^{+}$, $Ag^{+}$, $Mg^{2+}$, $Ca^{2+}$, $Cu^{2+}$, $Pb^{2+}$, $Co^{2+}$, $Al^{3+}$, $Cr^{3+}$ and $Fe^{3+}$.

In a sixth embodiment of the present disclosure, there is provided the packaging for a flexible secondary battery as defined in any one of the first to fifth embodiments, further comprising an adhesive layer between any two adjacent layers among the layers of the embodiment.

In a seventh embodiment of the present disclosure, there is provided the packaging for a flexible secondary battery as defined in any one of the first to sixth embodiments, wherein the heat shrink layer is surface modified.

In an eighth embodiment of the present disclosure, there is provided the packaging for a flexible secondary battery as defined in any one of the first to seventh embodiments, wherein the reduced graphene oxide layer has a thickness ranging from 20 nm to 100 μm.

In a ninth embodiment of the present disclosure, there is provided the packaging for a flexible secondary battery as defined in any one of the first to eighth embodiments, wherein adjacent sheets of the plurality of reduced graphene oxide sheets have an interlayer spacing ranging from 0.3 nm to 5.0 nm.

In a tenth embodiment of the present disclosure, there is provided a method for manufacturing a packaging for a flexible secondary battery wherein the method comprises preparing a mechanical support layer; coating a dispersion composition in which graphene oxide particles and a metal salt are dispersed on the mechanical support layer, and drying to form a graphene oxide layer; reducing the graphene oxide layer to form a reduced graphene oxide layer; forming a heat shrink layer on the reduced graphene oxide layer; forming a sealant layer on the heat shrink layer; and wrapping the packaging around an outer surface of an electrode assembly of a flexible secondary battery such that the sealant layer is in contact with the outer surface of the electrode assembly of the flexible secondary battery.

In an eleventh embodiment of the present disclosure, there is provided the method for manufacturing a packaging for a flexible secondary battery as defined in the tenth embodiment, wherein the step of reducing the graphene oxide layer is carried out using hydriodic acid or vitamin C.

In a twelfth embodiment of the present disclosure, there is provided a flexible secondary battery comprising an electrode assembly; and the packaging for a flexible secondary battery according to the first embodiment, wherein the packaging for a flexible secondary battery is wrapped around an outer surface of the electrode assembly.

Advantageous Effects

The packaging for a flexible secondary battery according to the present disclosure further comprises a reduced graphene oxide layer on a heat shrink layer having the shape of a film or a tube, and the reduced graphene oxide layer blocks the passage through which vapor and/or gas enters very effectively due to electrostatic interaction between reduced graphene oxide sheets of the reduced graphene oxide layer.

Particularly, the above-described effect of blocking the passage through which vapor and gas enter very effectively cannot be expected from a reduced graphene oxide layer simply formed with a layer structure of reduced graphene oxide sheets without physical or chemical bonding between adjacent reduced graphene oxide sheets in the reduced graphene oxide layer. The reason is that when graphene oxide or reduced graphene oxide itself is used in a packaging film, it is impossible to prevent the ingress of vapor and gas due to the presence of a few water monolayers in an interlayer of graphene oxide.

In addition, the packaging for a flexible secondary battery does not use a metal layer such as aluminum, which makes the finally completed flexible secondary battery flexible, thereby reducing stresses that occur when the flexible secondary battery bends.

BEST MODE

Figure 1:
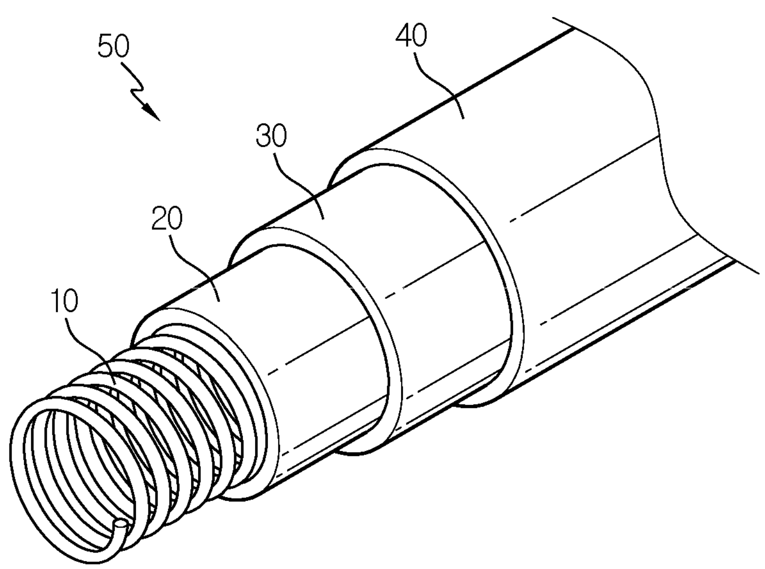
FIG. 1 is a diagram showing the structure of an embodiment of a general flexible secondary battery.

Hereinafter, the present disclosure will be described in detail. It should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation. Therefore, the embodiments described herein and illustration in the drawings are just a most preferred embodiment of the present disclosure, and they are not intended to fully describe the technical aspects of the present disclosure, so it should be understood that other equivalents and modifications could be made thereto at the time the application was filed.

It will be understood that when an element is referred to as being "connected to" another element, it can be "directly connected to" the other element and it may be "electrically connected" to the other element with intervening elements interposed between.

It will be understood that when an element is referred to as being disposed "on", "on one side of" or "on the other side of" another element, it can be placed in contact with one surface of the other element or with an adhesive layer interposed between the two elements, and intervening elements may be present.

When used in this specification, "comprise" specifies the presence of stated elements, but does not preclude the presence or addition of one or more other elements, unless the context clearly indicates otherwise. It will be understood that "about" is used herein in the sense of at, or nearly at, when given the manufacturing and material tolerances inherent in the stated circumstances and is used to prevent the unscrupulous infringer from unfairly taking advantage of the disclosure where exact or absolute figures are stated as an aid to understanding the present disclosure.

When used in this specification, "A and/or B" specifies "either A or B, or both".

When used in this specification, "graphene" refers to the form of a plurality of carbon atoms joined together by covalent bonds to form a polycyclic aromatic molecule. The carbon atoms joined together by covalent bonds form six-membered rings as repeat units, but may further include five-membered rings and/or seven-membered rings. Accordingly, a sheet of graphene may be the form of a single layer of covalently bonded carbon atoms, but is not limited thereto. The sheet of graphene may have various structures, and these structures may differ depending on the number of five-membered rings and/or seven-membered rings that may be included in graphene. Additionally, when the sheet of graphene is a single layer, sheets of graphene may be stacked to form multiple layers, and the graphene sheet may be saturated with hydrogen atoms at the edge on the side, but is not limited thereto.

When used in this specification, "graphene oxide" may be shorted as "GO". The graphene oxide may include a structure in which a functional group containing oxygen such as a carboxyl group, a hydroxyl group or an epoxy group is bonded on a single layer of graphene, but is not limited thereto.

When used in this specification, "reduced graphene oxide" refers to graphene oxide having reduced oxygen content by reduction, and may be shorted as "rGO", but is not limited thereto. In a non-limiting example, the oxygen content in the reduced graphene oxide may be 0.01 to 30 at. % based on 100 at. % of carbon, but is not limited thereto.

In the present disclosure, the heat shrink layer may be in the shape of a film or a tube.

When the heat shrink layer is in the shape of a film, the heat shrink layer may be stacked with the other layer such as the mechanical support layer, the reduced graphene oxide layer and the sealant layer, and then wrapped around the electrode assembly to form a tube-type packaging.

When the heat shrink layer is in the shape of a tube, the other layer such as the mechanical support layer, the reduced graphene oxide layer and the sealant layer may be applied to the inner or outer side of the tube to form a tube-type packaging.

Preferably, heat shrink processing is performed on the heat shrink layer at low temperature to prevent thermal damage to the secondary battery, and generally, it is required to complete heat shrinking at the temperature of 70 to 200° C., or 70 to 150° C., more preferably 100 to 150° C., even more preferably 70 to 120° C. To this end, the heat shrink layer may be formed from modified polymer of at least one selected from the group consisting of polyolefin such as polyethylene and polypropylene, polyesters such as polyethyleneterephthalate, fluororesin such as polyvinylidene fluoride and polytetrafluoroethylene and polyvinyl chloride.

The heat shrink layer may have the thickness ranging from 1 μm to 1000 μm, or from 10 μm to 500 μm, or from 30 μm to 250 μm to reduce the distance between the electrode and the case and ensure flexibility.

The heat shrink layer may be optionally modified to make the surface hydrophilic by oxygen or nitrogen plasma treatment. To form a reduced graphene oxide layer on the heat shrink layer, first, when forming a graphene oxide layer on the heat shrink layer, in case that the heat shrink layer has a hydrophobic surface, surface energy is generated due to a difference between hydrophobicity of the heat shrink layer surface and hydrophilicity of the graphene oxide, and as a result, it may be difficult to achieve a uniform coating of the graphene oxide layer on one surface of the heat shrink layer.

To control this, surface modification may be performed to modify the surface of the heat shrink layer having the hydrophobic surface to be hydrophilic. The surface modification may be performed by UV-ozone treatment, plasma surface treatment using oxygen or nitrogen, chemical treatment using a silane coupling agent such as amino silane, or surface coating using polymer or an organic compound, but is not limited thereto. Whether or not the surface energy of the graphene oxide layer and the surface energy of the modified heat shrink layer have equal or similar values may be determined by measuring the contact angle of a water drop of each layer.

According to a particular embodiment of the present disclosure, as described above, a heat shrinkable tube may be used as the heat shrink layer. In the specification, the "heat shrinkable tube" is a tube that shrinks when heated, and refers to a material that air-tightly wraps a terminal or other material of a different shape or size. In the present disclosure, after the electrode assembly is inserted into the heat shrinkable tube, when heat is applied, the heat shrinkable tube is heated, and as it shrinks, the heat shrinkable tube tightly packages the outer surface of the electrode assembly. Through the air-tight packaging, the vapor barrier performance of the packaging may be improved so much, and at the same time, the insulation effect may be obtained through the heat shrinkable tube. There are commercially available heat shrinkable tubes of various materials and shapes. An embodiment of the present disclosure may provide a new packaging comprising a commercially available heat shrinkable tube and an additional layer.

The reduced graphene oxide layer may be disposed on one surface or two surfaces of the heat shrink layer. In more detail, when the heat shrinkable tube is used as the heat shrink layer and the reduced graphene oxide layer is disposed on one surface of the heat shrink layer, the reduced graphene oxide layer may be disposed on the inner or outer surface of the heat shrinkable tube.

The reduced graphene oxide layer is a component that imparts an effect of preventing the ingress of vapor and/or gas to the packaging for a flexible secondary battery according to the present disclosure. The barrier effect may depend on factors such as the thickness of the graphene oxide layer and the degree of alignment of graphene oxide, and they may be determined by a process condition for producing reduced graphene oxide. The process condition may include, but is not limited to, the purity of the graphene oxide, the concentration of a graphene oxide dispersion composition, the coating time, the number of coatings, the evaporation rate of a dispersion medium after coating and the presence or absence of a shear force.

Figure 6:
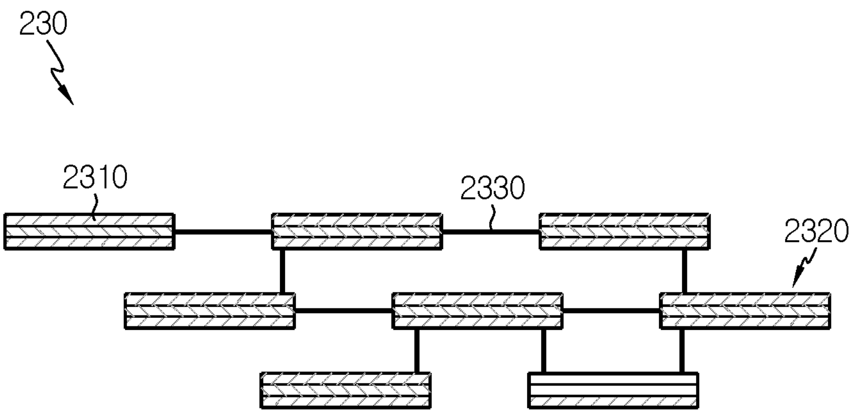
FIG. 6 is a schematic internal cross-sectional view of a reduced graphene oxide layer according to an embodiment of the present disclosure.

Seeing a schematic cross-sectional view of the reduced graphene oxide layer 230 according to the present disclosure with reference to FIG. 6, reduced graphene oxide particles 2310 are stacked to form a reduced graphene oxide sheet 2320, and a plurality of reduced graphene oxide sheets 2320 form a reduced graphene oxide layer, and in this instance, the reduced graphene oxide sheets 2320 form electrostatic interaction 2330 with adjacent reduced graphene oxide sheets by the medium of a metal cation.

It should be understood that 'electrostatic interaction' as used herein includes ionic bonding.

In more detail, the metal cation forms electrostatic interaction with oxygen functional groups at the edge of the reduced graphene oxide particles. Since the oxygen functional group has (−) charge and the metal cation has (+) charge, for a sufficient attractive force by electrostatic interaction between two or more reduced graphene oxide particles, the cation preferably has the oxidation number of 2+ or more. Additionally, an attractive force between the metal cation and the reduced graphene oxide particles is interaction occurring at the edge of the reduced graphene oxide particles, and thus a spacing between the reduced graphene oxide sheets on the basal plane is maintained.

According to a particular embodiment of the present disclosure, the reduced graphene oxide sheet may have a structure of one to three layers of reduced graphene oxide particles, for example, reduced graphene oxide platy particles. The number of stacks of reduced graphene oxide is set before the reduction reaction of graphene oxide. In general, graphene oxide is synthesized by oxidation of graphite and then ultrasonic dispersion, and the layer structure of graphene oxide particles may be adjusted by adjusting the oxidation level of graphite at the graphite oxidation step. When the layer structure of reduced graphene oxide particles is the same as described above, it is possible to significantly reduce the probability that defects may occur during coating of the reduced graphene oxide, and improve the mechanical properties of the formed reduced graphene oxide layer.

According to a particular embodiment of the present disclosure, the reduced graphene oxide sheet may have the thickness ranging from 0.002 to 10 μm, or from 0.005 to 1 μm, or from 0.01 to 0.1 μm. When the reduced graphene oxide sheet has the above-described range of thickness, it is possible to achieve flexible mechanical properties and effective vapor barrier.

In the present disclosure, for a very small interlayer spacing, it is desirable to use the graphene oxide having a predetermined level of purity or above. For example, the graphene oxide of purity 93% or higher, or 97.5% or higher, or 99.5% or higher may be used. In relation to this, in the specification, 'purity' refers to a ratio of the weight of graphene oxide to the total weight of graphene oxide and metal residue.

According to a particular embodiment of the present disclosure, a metal cation of the metal salt may be at least one of $Li^+$, $K^+$, $Ag^+$, $Mg^{2+}$, $Ca^{2+}$, $Cu^{2+}$, $Pb^{2+}$, $Co^{2+}$, $Al^{3+}$, $Cr^{3+}$ and $Fe^{3+}$. Among the exemplary metal cations, the metal cation $Al^{3+}$, $Cr^{3+}$ or $Fe^{3+}$ is especially desirable since it can effectively exert an electrostatic attractive force due to high oxidation number. An anion that makes up the metal salt with the metal cation may include, without limitation, any type that serves the purpose of the present disclosure, and non-limiting examples may include $Cl^-$, $NO_3^-$ or $SO_4^{2-}$.

According to a particular embodiment of the present disclosure, the metal salt may be added to the dispersion medium in an amount of 0.01 to 10 weight % or 0.01 to 1 weight % based on the weight of the graphene oxide particles. When the metal salt is present in the above-described range of amounts, it is possible to prevent metal particles from being formed and a nanometer-scale gap from being created between the reduced graphene sheets due to excess metal cations, and to form a proper electrostatic interaction.

According to a particular embodiment of the present disclosure, the dispersion composition may include graphene oxide in an amount of about 0.0001 parts by weight to about 0.01 parts by weight based on 100 parts by weight of the dispersion medium. Within the above-described range, when the graphene oxide is present in an amount of 0.0001 parts by weight or more, it is possible to induce the alignment of graphene oxide when forming the graphene oxide layer, and when the graphene oxide is present in an amount of 0.01 parts by weight or less, it is possible to achieve good dispersion. For example, the graphene oxide dispersion composition may include graphene oxide in an amount of about 0.0001 parts by weight to about 0.01 parts by weight, about 0.0004 parts by weight to about 0.01 parts by weight, or about 0.0004 parts by weight to about 0.008 parts by weight based on 100 parts by weight of the dispersion medium, but is not limited thereto.

The dispersion may use an ultrasonic generator such as an ultrasonic dispersion device, but is not limited thereto.

According to a particular embodiment of the present disclosure, the graphene oxide dispersion composition may further include an organic solvent to allow the dispersion of the graphene oxide. Non-limiting examples of the organic solvent may include, but are not limited to, alcohol, dimethyl formamide (DMF), dimethyl sulfoxide (DMSO), N-methyl pyrrolidone, methyl phenol, cresol, or a combination thereof. The graphene oxide dispersion composition may further include about 100 volume % or less of the organic solvent to allow the dispersion of the graphene oxide based on 100 volume % of the dispersion medium. For example, the graphene oxide dispersion composition may further include the organic solvent to allow the dispersion of the graphene oxide, in an amount of about 1 volume % to about 100 volume %, about 20 volume % to about 80 volume %, or about 40 volume % to about 60 volume % based on 100 volume % of the dispersion medium, but is not limited thereto.

The reduced graphene oxide layer may be obtained by applying graphene oxide to one surface of the heat shrink film or the inner or outer surface of the heat shrinkable tube to form a graphene oxide layer and reducing the graphene oxide layer.

Non-limiting examples of application of graphene oxide to one surface of the heat shrink film may include, but are not limited to, a lamination method.

Non-limiting examples of application of graphene oxide to the heat shrinkable tube may include, but are not limited to, gas/air flow, spray and electrospray.

In an embodiment, when graphene oxide is applied to the inner surface of the heat shrinkable tube, the gas/air flow method may be selected.

In another embodiment, when graphene oxide is applied to the inner surface of the heat shrinkable tube, the spray and electrospray methods may be selected. Its non-limiting method may include mixing a graphene oxide dispersion with a volatile liquid such as ethanol or isopropanol (IPA) at a predetermined ratio and spraying the mixture together with nitrogen or argon gas to form a graphene oxide thin film. In this instance, the gas spray pressure may be 0.1 to 20 bar, the spraying rate of dispersion may be set between 0.1 mL/min and 100 mL/min, and the distance between a spray nozzle and a medium to be coated may be 1 cm to 50 cm.

The graphene oxide dispersion composition may be coated on one surface, for example, the outer surface of the heat shrinkable tube.

For the benefit of vapor barrier performance when the dried graphene oxide layer has the thickness of 20 nm or more and mechanical properties when the dried graphene oxide layer has the thickness of 100 μm or less, the dried graphene oxide layer may have the thickness ranging from 20 nm to 30 μm, or from 100 nm to 10 μm, or from 500 nm to 5 μm.

The obtained graphene oxide layer may undergo reduction to maximize the vapor barrier property of the vapor barrier film, to form a reduced graphene oxide layer.

For the reduction, a reduction method using hydriodic acid (HI) or a reduction method using vitamin C may be used.

In the case of the reduction method using hydriodic acid, the reduced graphene oxide layer may be obtained by the steps of putting together a container containing a hydriodic acid solution and the formed graphene oxide layer into a space that is sealed, for example, a glass petri dish, performing thermal treatment at the temperature between 10° C. and 100° C. for 1 min to 1 hour to evaporate the hydriodic acid, and maintaining the evaporated hydriodic acid and the graphene oxide layer for 2 min to 3 hours to convert the graphene oxide layer to reduced graphene oxide.

Alternatively, the reduced graphene oxide layer may be obtained by the steps of immersing the formed graphene oxide layer in a hydriodic acid solution of 10 to 100° C., for example, 90° C., for example, for 12 hours or longer to convert the graphene oxide layer to reduced graphene oxide, and washing the reduced graphene oxide layer with distilled water. The obtained reduced graphene oxide layer may be washed with ethanol. The drying may be performed at room temperature, for example, 23 to 25° C., and in a non-limiting example, 25° C.

In the case of the reduction method using vitamin C, the reduced graphene oxide layer may be formed by the steps of dissolving, for example, ascorbic acid in distilled water to prepare an ascorbic acid solution at the concentration of 0.01 mg/mL to 5 mg/mL, or 0.05 mg/mL to 0.3 mg/mL; and immersing the graphene oxide layer in the ascorbic acid solution having the temperature ranging from 25 to 90° C. to reduce the graphene oxide layer.

The obtained reduced graphene oxide sheets may have a structure that can block the ingress of vapor and/or gas, and may have an interlayer spacing, for example, ranging from 0.3 nm to 5.0 nm, or from 0.3 nm to 0.7 nm.

The "interlayer spacing" as used herein refers to a spacing between the reduced graphene oxide sheets, i.e., a distance between the reduced graphene oxide sheets.

As opposed to the present disclosure, in case that there is no electrostatic interaction between the reduced graphene oxide sheets of the reduced graphene oxide layer, there is no chemical and/or physical connector between the reduced graphene oxide sheets, and a defect in vapor barrier may be developed. As a consequence, water particles pass through the reduced graphene oxide sheets, causing degraded performance of the battery packaged with the film for packaging a secondary battery including the reduced graphene oxide layer.

The mechanical support layer serves to prevent the reduced graphene oxide layer from being damaged by external stresses or impacts, and may use, without limitation, any type of material having sufficient mechanical properties for preventing the reduced graphene oxide layer from being damaged by external stresses or impacts, and may be formed on the outer side of the reduced graphene oxide.

Non-limiting examples of the material of which the mechanical support layer is made, may include, but are not limited to, at least one selected from the group consisting of polyolefin such as high density polyethylene, low density polyethylene, linear low density polyethylene, ultra high molecular weight polyethylene and polypropylene; polyester such as polyethyleneterephthalate and polybutyleneterephthalate; polyacetal; polyamide; polycarbonate; polyimide; fluoropolymer such as polyvinylidene fluoride; polyetheretherketone; polyethersulfone; polyphenyleneoxide; polyphenylenesulfide; and polyethylenenaphthalate.

The sealant layer is formed at a location at which the sealant layer comes into contact with the outer surface of the electrode assembly. For example, the sealant layer may be disposed at the innermost side of the tube-type packaging for a flexible secondary battery.

The sealant layer has a thermally adhesive property or a hot melt property that makes it adhere to by heat, and each may independently include an least one selected from the group consisting of polypropylene-acrylic acid copolymer, polyethylene-acrylic acid copolymer, polypropylene chloride, polypropylene-butylene-ethylene terpolymer, polypropylene, polyethylene and ethylene propylene copolymer.

Additionally, the adhesive strength between the mechanical support layer and the reduced graphene oxide layer, between the reduced graphene oxide layer and the heat shrink layer, and between the reduced graphene oxide layer and the sealant layer may be insufficient. Thus the packaging for a flexible secondary battery may further include an adhesive layer between adjacent layers facing each other. Through this, the adhesive property and the vapor barrier property may be further improved. The material of the adhesive layer may include, but is not limited to, for example, a urethane-based material, an acrylic material and a composition containing thermoplastic elastomer.

Describing an embodiment of the present disclosure in more detail, in an embodiment of a packaging for a flexible secondary battery that is wrapped around an outer surface of an electrode assembly of the flexible secondary battery, the packaging for the flexible secondary battery is in the shape of a tube that is wrapped around the outer surface of the electrode assembly, and comprises a mechanical support layer; a reduced graphene oxide (rGO) layer disposed on the mechanical support layer, and including a plurality of reduced graphene oxide sheets; a heat shrink layer disposed on the reduced graphene oxide layer; and a sealant layer disposed on the heat shrink layer, wherein the plurality of reduced graphene oxide sheets in the reduced graphene oxide layer forms electrostatic interaction between adjacent reduced graphene oxide sheets.

Figure 2:
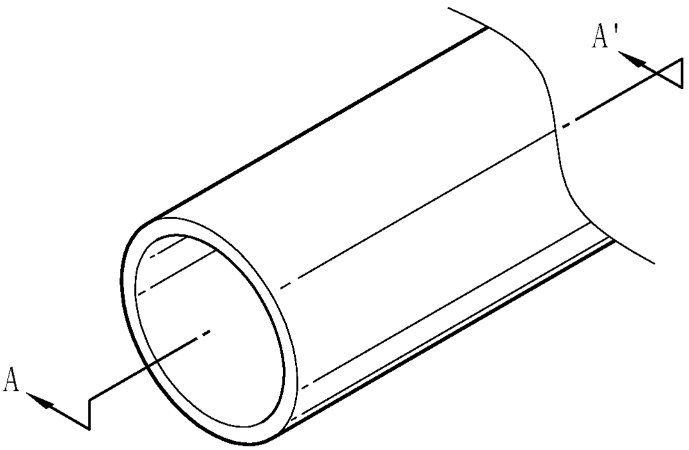
FIG. 2 is a schematic perspective view of a tube-type packaging for a flexible secondary battery according to an embodiment of the present disclosure.
Figure 3:
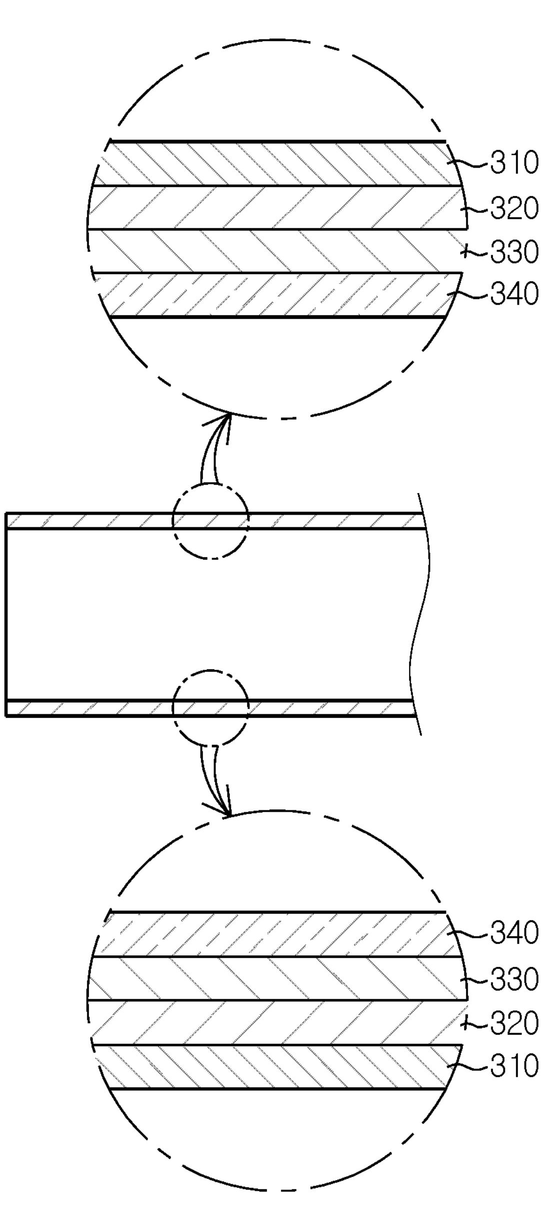
FIG. 3 is a schematic cross-sectional view of a film that constitutes a packaging for a flexible secondary battery according to an embodiment of the present disclosure.
Figure 4:
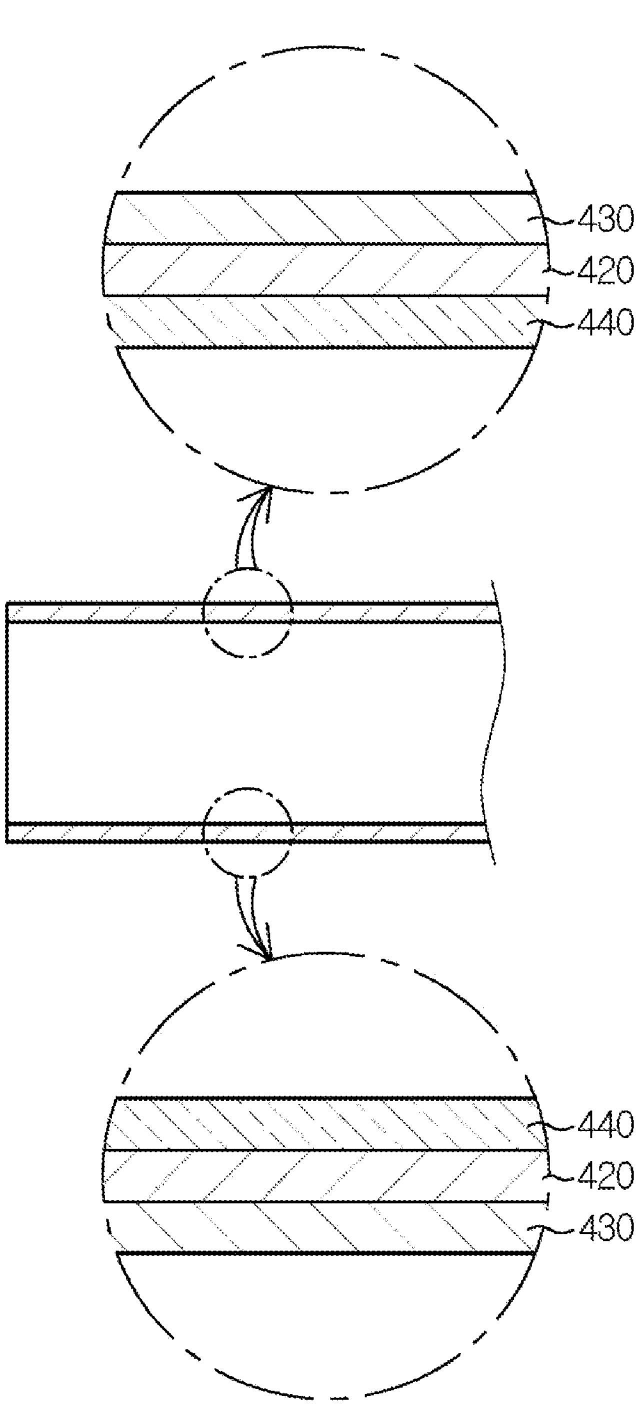
FIG. 4 is a schematic cross-sectional view of a film that constitutes a packaging for a flexible secondary battery according to an embodiment of the present disclosure.
Figure 5:
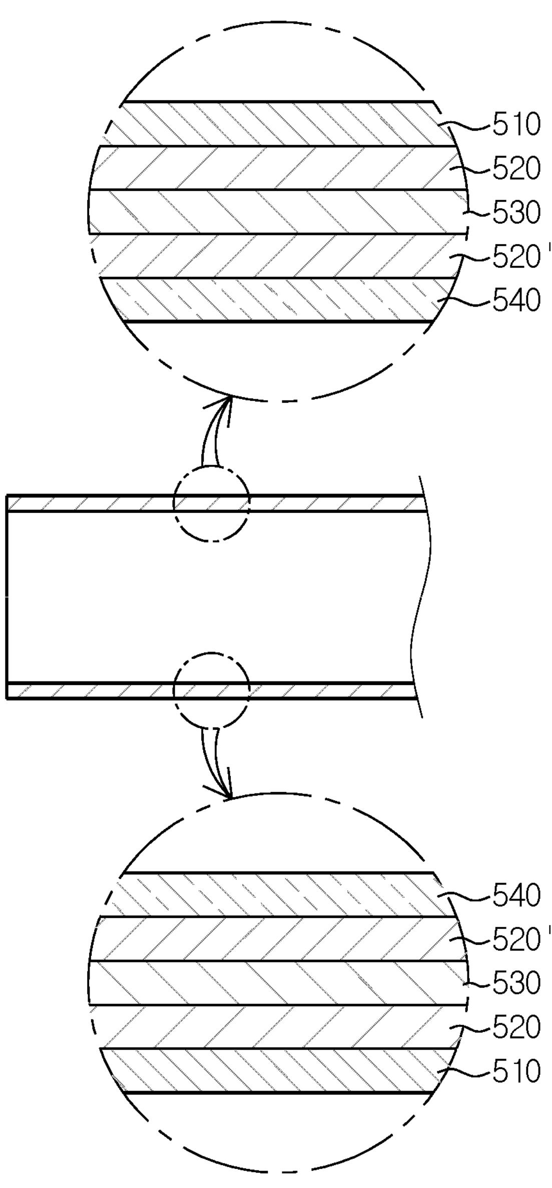
FIG. 5 is a schematic cross-sectional view of a film that constitutes a packaging for a flexible secondary battery according to an embodiment of the present disclosure.

FIG. 2 shows an embodiment of a tube-type packaging for a flexible secondary battery, and a film in cross section taken along the line A-A' of FIG. 2 is shown in FIGS. 3 to 5 in detail.

Referring to FIG. 3, the packaging for a flexible secondary battery according to the above-described embodiment may include a mechanical support layer 310, a reduced graphene oxide layer 320 disposed on the mechanical support layer 310, a heat shrink layer 330 disposed on the reduced graphene oxide layer 320, and a sealant layer 340 disposed on the heat shrink layer 330 in a sequential order in the thicknesswise direction. The mechanical support layer 310 is disposed facing the outside of the packaging for a flexible secondary battery, and the sealant layer 340 is disposed facing the inside of the packaging for a flexible secondary battery. Additionally, the packaging for a flexible secondary battery may further include an adhesive layer between any two adjacent ones of the above-described layers.

In another embodiment of a packaging for a flexible secondary battery that is wrapped around the outer surface of an electrode assembly of the flexible secondary battery, there is provided the packaging for a flexible secondary battery comprising a heat shrink layer; a reduced graphene oxide layer disposed on the heat shrink layer and including a plurality of reduced graphene oxide sheets; and a sealant layer disposed on the reduced graphene oxide layer, wherein the reduced graphene oxide sheets of the reduced graphene oxide layer form electrostatic interaction between adjacent reduced graphene oxide sheets, and the packaging for a flexible secondary battery is in the shape of a tube that is wrapped around the outer surface of the electrode assembly.

Referring to FIG. 4, the packaging for a flexible secondary battery according to the above-described embodiment may include a heat shrink layer 430, a reduced graphene oxide layer 420 disposed on one side of the heat shrink layer 430, and a sealant layer 440 disposed on the other side of the reduced graphene oxide layer 420 in a sequential order in the thicknesswise direction. The heat shrink layer 430 is disposed facing the outside of the packaging for a flexible secondary battery, and the sealant layer 440 is disposed facing the inside of the packaging for a flexible secondary battery. Additionally, the packaging for a flexible secondary battery may further include an adhesive layer between any two adjacent ones of the above-described layers.

In still another embodiment of a packaging for a flexible secondary battery that is wrapped around the outer surface of an electrode assembly of the flexible secondary battery, there is provided the packaging for a flexible secondary battery comprising a mechanical support layer; a reduced graphene oxide layer disposed on the mechanical support layer and including a plurality of reduced graphene oxide sheets; a heat shrink layer disposed on the reduced graphene oxide layer; a reduced graphene oxide layer disposed on the heat shrink layer; and a sealant layer disposed on the reduced graphene oxide layer, wherein the reduced graphene oxide sheets of the reduced graphene oxide layer form electrostatic interaction between adjacent reduced graphene oxide sheets, and the packaging for a flexible secondary battery is in the shape of a tube that is wrapped around the outer surface of the electrode assembly.

Referring to FIG. 5, the packaging for a flexible secondary battery according to the above-described embodiment may include a mechanical support layer 510, a reduced graphene oxide layer 520 disposed on the mechanical support layer 510 and including a plurality of reduced graphene oxide sheets, a heat shrink layer 530 disposed on the reduced graphene oxide layer 520, another reduced graphene oxide layer 520' disposed on the heat shrink layer 530 and a sealant layer 540 disposed on the reduced graphene oxide layer 520' in a sequential order in the thicknesswise direction. The mechanical support layer 510 is disposed facing the outside of the packaging for a flexible secondary battery, and the sealant layer 540 is disposed facing the inside of the packaging for a flexible secondary battery. Additionally, the packaging for a flexible secondary battery may further include an adhesive layer between any two adjacent ones of the above-described layers.

According to a particular embodiment of the present disclosure, there may be provided the packaging for a flexible secondary battery in which a stack comprising 'the mechanical support layer, the reduced graphene oxide (rGO) layer, the heat shrink layer and the sealant layer' or a stack comprising 'the heat shrink layer, the reduced graphene oxide layer and the sealant layer' is formed in the shape of a tube.

The stack may be formed in the shape of a tube that is wrapped around the outer surface of the electrode assembly according to the following two embodiments.

In an embodiment, the sealant layer formed on one surface at one end of the stack may be disposed on the tube-type outermost layer, for example, the mechanical support layer or the heat shrink layer, such that they overlap.

Alternatively, in another embodiment, the sealant layer formed on one surface at one end of the stack and the sealant layer formed on one surface at the other end of the stack may be disposed facing each other so that they adhere to each other. In this instance, the adhered parts may form a wing, and the wing may be bent in one direction along the outer peripheral surface of the outermost layer.

According to the present disclosure, there is provided a flexible secondary battery comprising the packaging for a flexible secondary battery.

The packaged flexible secondary battery according to the present disclosure comprises an electrode assembly that has a horizontal cross section of a predetermined shape and extends in the lengthwise direction, wherein the electrode assembly comprising an inner electrode, a separation layer formed around the inner electrode to prevent a short circuit of the electrode, and an outer electrode formed around the outer surface of the separation layer; and the packaging for a flexible secondary battery according to the present disclosure that is tightly wrapped around the entire outer surface of the electrode assembly.

In the present disclosure, the 'predetermined shape' is not limited to a particular shape, and may include any shape without departing from the nature of the present disclosure. The horizontal cross section of the predetermined shape may be circular or polygonal, and the circular structure is a circular structure of geometrically perfect symmetry and an oval structure of asymmetry. The polygonal structure is not limited to a particular shape, and non-limiting examples of the polygonal structure may include a triangular shape, a quadrilateral shape, a pentagonal shape or a hexagonal shape.

The flexible secondary battery of the present disclosure has the horizontal cross section of the predetermined shape and a linear structure that elongates in the lengthwise direction of the horizontal cross section, and it is so flexible that it can change the shape freely.

In the present disclosure, the inner electrode of the electrode assembly may include a lithium ion supplying core including an electrolyte, an inner current collector of an open structure formed around the outer surface of the lithium ion supplying core and an inner electrode active material layer formed on the surface of the inner current collector.

The open structure refers to a structure having an open boundary surface through which a substance may be transferred freely from the inside of the structure to the outside thereof.

The lithium ion supplying core may include an electrolyte, and the electrolyte is not limited to a particular type, and may include a non-aqueous electrolyte using ethylene carbonate (EC), propylene carbonate (PC), butylene carbonate (BC), vinylene carbonate (VC), diethyl carbonate (DEC), dimethyl carbonate (DMC), ethylmethylcarbonate (EMC), methyl formate (MF), γ-butyrolactone (γ-BL), sulfolane, methylacetate (MA) or methylpropionate (MP); a gel polymer electrolyte using PEO, PVdF, PMMA, PAN or PVAC; or a solid electrolyte using PEO, polypropylene oxide (PPO), polyethylene imine (PEI), polyethylene sulphide (PES) or polyvinyl acetate (PVAc). Additionally, the electrolyte may further include a lithium salt, and preferably, the lithium salt may include LiCl, LiBr, LiI, LiClO4, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloro borane lithium, lower aliphatic carboxylic acid lithium and lithium tetraphenyl borate. Additionally, the lithium ion supplying core may include the electrolyte alone, and in the case of a liquid electrolyte, the lithium ion supplying core may include a porous carrier.

The inner current collector of the present disclosure may have an open structure that allows the penetration of the electrolyte of the lithium ion supplying core, and the open structure may include any type of structure that allows the penetration of the electrolyte.

Preferably, the inner current collector may be manufactured using stainless steel, aluminum, nickel, titanium, sintered carbon, copper, or stainless steel treated with carbon, nickel, titanium or silver on the surface, aluminum-cadmium alloy, non-conductive polymer surface-treated with a conductive material, or conductive polymer.

The current collector serves to collect electrons produced by electrochemical reaction of the active material or supply electrons necessary for electrochemical reaction, and generally, metal such as copper or aluminum is used. Particularly, when a polymer conductor made of non-conductive polymer surface-treated with a conductive material or conductive polymer is used, flexibility is higher than when metal such as copper or aluminum is used. Additionally, it is possible to achieve weight reduction of the battery by replacing the metal current collector with a polymer current collector.

The conductive material may include polyacetylene, polyaniline, polypyrrole, polythiophene and poly sulfur nitride, indium thin oxide (ITO), silver, palladium and nickel, and the conductive polymer may include polyacetylene, polyaniline, polypyrrole, polythiophene and poly sulfur nitride. The non-conductive polymer used in the current collector is not limited to a particular type.

The inner electrode active material layer of the present disclosure is formed on the surface of the inner current collector. In this instance, the inner electrode active material layer may be formed around the outer surface of the inner current collector such that the open structure of the inner current collector is not exposed to the outer surface of the inner electrode active material layer, and the inner electrode active material layer may be formed on the surface of the open structure of the inner current collector such that the open structure of the inner current collector is exposed to the outer surface of the inner electrode active material layer. For example, an active material layer may be formed on the surface of a wound wire-type current collector, and a wire-type current collector having an electrode active material layer may be wound.

The outer current collector of the present disclosure is not limited to a particular type, but may include a pipe-type current collector, a wound wire-type current collector or a mesh-type current collector. Additionally, the outer current collector may be made of stainless steel, aluminum, nickel, titanium, sintered carbon, copper; stainless steel treated with carbon, nickel, titanium or silver on the surface; aluminum-cadmium alloy; non-conductive polymer surface-treated with a conductive material; conductive polymer; a metal paste including metal powder of Ni, Al, Au, Ag, Al, Pd/Ag, Cr, Ta, Cu, Ba or ITO; or a carbon paste including carbon powder of graphite, carbon black or carbon nanotubes.

The inner electrode may be a negative or positive electrode, and the outer electrode may be a positive or negative electrode opposite to the inner electrode.

The electrode active material layer of the present disclosure allows ions to move through the current collector, and the movement of ions is made by interaction through intercalation and deintercalation of ions to/from an electrolyte layer. The electrode active material layer may include natural graphite, artificial graphite, a carbonaceous material; lithium containing titanium composite oxide (LTO); metals (Me) including Si, Sn, Li, Zn, Mg, Cd, Ce, Ni or Fe; alloys of the metals (Me); oxide ($MeO_x$) of the metals (Me); and composite of the metals (Me) and carbon. The positive electrode active material layer may include $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (M1 and M2 are, independently, any one selected from the group consisting of Al, Ni, Co, Fe, Mn, V, Cr, Ti, W, Ta, Mg and Mo, and x, y and z are independently atomic fractions of elements that form the oxide, where $0 \le x < 0.5$, $0 \le y < 0.5$, $0 \le z < 0.5$, $x+y+z \le 1$).

The separation layer of the present disclosure may use an electrolyte layer or a separator.

The electrolyte layer serving as an ion channel uses a gel polymer electrolyte using PEO, PVdF, PMMA, PAN or PVAC, or a solid electrolyte using PEO, polypropylene oxide (PPO), polyethylene imine (PEI), polyethylene sulphide (PES) or polyvinyl acetate (PVAc). Preferably, the solid electrolyte matrix may have a framework of polymer or ceramic glass. In the case of a general polymer electrolyte, even though ionic conductivity is satisfied, ions may move very slowly due to the reaction rate, and thus it is preferable to use the gel polymer electrolyte having easier movement of ions than a solid polymer electrolyte. The gel polymer electrolyte has poor mechanical properties, and to improve the mechanical properties, the gel polymer electrolyte may include a pore structure support or crosslinked polymer. The electrolyte layer of the present disclosure may act as a separator, thereby eliminating the need to use a separate separator.

The electrolyte layer of the present disclosure may further include a lithium salt. The lithium salt may improve the ionic conductivity and reaction rate, and non-limiting examples may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloro borane lithium, lower aliphatic carboxylic acid lithium and lithium tetraphenyl borate.

The separator is not limited to a particular type, and may include a porous substrate made of polyolefin-based polymer selected from the group consisting of ethylene homopolymer, propylene homopolymer, ethylene-butene copolymer, ethylene-hexene copolymer and ethylene-methacrylate copolymer; a porous substrate made of polymer selected from the group consisting of polyester, polyacetal, polyamide, polycarbonate, polyimide, polyetheretherketone, polyethersulfone, polyphenyleneoxide, polyphenylenesulfide and polyethylenenaphthalene; or a porous substrate made of a mixture of inorganic particles and binder polymer. Additionally, the separator may further include a porous coating layer including a mixture of inorganic particles and binder polymer on at least one surface of the porous substrate made of the above-described polymer. Particularly, to easily transport the lithium ions of the lithium ion supplying core to the outer electrode, it is desirable to use the separator of a non-woven fabric corresponding to the porous substrate made of polymer selected from the group consisting of polyester, polyacetal, polyamide, polycarbonate, polyimide, polyetheretherketone, polyethersulfone, polyphenyleneoxide, polyphenylenesulfide and polyethylenenaphthalene.

Additionally, a method for manufacturing a flexible secondary battery according to an aspect of the present disclosure comprises:

(S1) preparing an electrode assembly that has a horizontal cross section of a predetermined shape and extends in the lengthwise direction, the electrode assembly comprising an inner electrode, a separation layer formed around the inner electrode to prevent a short circuit of the electrode, and an outer electrode formed around the outer surface of the separation layer; and (S2) inserting the electrode assembly into the packaging for a flexible secondary battery, and then heating to join the packaging for a flexible secondary battery with the electrode assembly.

The flexible secondary battery according to an embodiment of the present disclosure applies a skin-tight packaging to the electrode assembly, and there is no wrinkle. As a result, the flexibility of the battery may be improved. Additionally, the packaging comprising the heat shrinkable tube may provide much improved flexibility of the battery.

MODE FOR DISCLOSURE

Example 1

Formation of Mechanical Support Layer-Reduced Graphene Oxide Layer

A polyethylene terephthalate film (LAMI-ACE, a laminating film) was prepared as a mechanical support layer.

To form a reduced graphene oxide layer on the mechanical support layer, graphene oxide particles (graphene oxide powder, Standard Graphene) were put into deionized water, and energy was applied using an ultrasonic dispersion device to prepare a graphene oxide dispersion composition at the concentration of 1 mg/mL. Subsequently, $CuCl_2$ (Sigma Aldrich, $CuCl_2$) was added to the dispersion composition in an amount of 1 weight % based on the weight of graphene oxide. The dispersion composition was poured onto the prepared mechanical support layer, i.e., the polyethylene terephthalate (PET) film, followed by coating by bar coating and drying to form a graphene oxide layer. The formed graphene oxide layer was immersed in a hydriodic acid solution (TCI, 57% Hydriodic acid) of 90° C. and maintained for 12 hours or longer. The formed reduced graphene oxide layer was taken out of the hydriodic acid solution, washed with distilled water and dried at room temperature to form a mechanical support layer-reduced graphene oxide layer. It was found that the reduced graphene oxide layer is about 100 nm in thickness, the reduced graphene oxide sheet of the layer was 1 to 4 nm in thickness, and an interlayer spacing between the reduced graphene oxide sheets was about 0.3 to 0.4 nm.

The interlayer spacing between the reduced graphene oxide sheets was measured using XRD and calculated using Brag equation. The used XRD was Bruker D4 Endeavor.

The thickness of the reduced graphene oxide layer was determined by observing the cross section of the synthesized reduced graphene oxide layer using SEM, and the used SEM was Hitachi 4800.

The thickness of the reduced graphene oxide sheet was measured using Atomic Force Microscope (AFM) after the reduced graphene oxide sheet was spin-cast on a $SiO_2$ substrate, and the used AFM was Park Systems NX10.

Subsequently, a heat shrink layer was formed on the reduced graphene oxide layer using a lamination method. A modified polyvinylidene fluoride film (YoulChon Chemical) was used as the heat shrink layer.

A polypropylene film (YoulChon Chemical) corresponding to a sealant layer was formed on the formed heat shrink layer layer using a lamination method. Accordingly, the mechanical support layer-reduced graphene oxide layer-heat shrink layer-sealant layer was obtained.

Application of Packaging for Flexible Secondary Battery and Manufacture of Flexible Secondary Battery Manufacture of Negative Electrode Artificial graphite as a negative electrode active material, denka black (carbon black) as a conductive material and polyvinylidene fluoride (PVdF) as a binder were mixed at a weight ratio of 75:5:25, and N-methylpyrrolidone (NMP) as a solvent was added to prepare a negative electrode slurry.

The negative electrode slurry was coated on a wire-type copper current collector having the diameter of 250 μm in a loading amount of 3.8 $mAh/cm^2$ and dried to prepare a wire-type negative electrode having a negative electrode active material layer. The prepared four wire-type negative electrodes were prepared and wound in the shape of a spring to form an inner negative electrode unit of an open structure having a hollow space inside and a lithium ion supplying core. A polyolefin film separator was wound on the outer side of the inner negative electrode unit to form a separation layer.

Manufacture of Positive Electrode $LiCoO_2$ as a positive electrode active material, denka black as a conductive material and polyvinylidene fluoride (PVdF) as a binder at a weight ratio of 85:5:15 were added to N-methylpyrrolidone (NMP) as a solvent to prepare a positive electrode active material slurry. The positive electrode active material slurry was coated on a sheet-type aluminum current collector and dried to prepare a positive electrode active material layer. Carbon black and PVdF as a conductive material were dispersed in an NMP solvent at a weight ratio of 1:1 to prepare a conductive layer slurry. The conductive layer slurry was coated on the positive electrode active material layer, a porous polymer non-woven substrate was placed on the conductive layer slurry and the conductive layer slurry was dried to prepare a sheet-type outer positive electrode. In this instance, the manufactured positive electrode was designed with 108% N/P ratio (discharge capacity ratio of negative to positive electrodes) (the amount of final positive electrode loading: 3.3 $mAh/cm^2$). The sheet-type outer positive electrode was cut to 2 mm width, and wound around the inner negative electrode and the separation layer to manufacture an electrode assembly.

Application of Packaging for Flexible Secondary Battery

The mechanical support layer-reduced graphene oxide layer-heat shrink layer-sealant layer was wrapped around the outer surface of the electrode assembly manufactured as described above, and in this instance, the sealant layer was overlapped with the upper layer of the outermost layer, i.e., the mechanical support layer and adhered to the outermost layer to form a tube type, and the outer surface of the electrode assembly comes into contact with the sealant layer. Subsequently, a non-aqueous electrolyte solution (1M $LiPF_6$, ethylene carbonate (EC)/propylene carbonate (PC)/diethyl carbonate (DEC)) was injected into the center of the inner electrode support of an open structure using a syringe to form a lithium ion supplying core, and heat was applied. Thus, the outer surface of the electrode assembly was completely sealed by the packaging for a flexible secondary battery in an air-tight manner.

As a result, a packaging for a secondary battery and a flexible secondary battery in which the packaging for a flexible secondary battery is in a shape of a tube that is wrapped around the outer surface of the electrode assembly of the flexible secondary battery were obtained.

Example 2

Formation of Heat Shrink Layer-Reduced Graphene Oxide Layer

A modified polyvinylidene fluoride film (YoulChon Chemical) was prepared as a heat shrink layer.

Graphene oxide particles (graphene oxide powder, Standard Graphen) were put into deionized water, and energy was applied using an ultrasonic dispersion device to prepare a graphene oxide dispersion composition at the concentration of 1 mg/mL. Subsequently, $CuCl_2$ (Sigma Aldrich, $CuCl_2$) was added to the dispersion composition in an amount of 1 weight % based on the weight of graphene oxide. The dispersion composition was poured onto the prepared heat shrink layer, followed by coating by bar coating and drying to form a graphene oxide layer. The formed graphene oxide layer was immersed in a hydriodic acid solution (TCI, 57% Hydriodic acid) of 90° C. and maintained for 12 hours or longer. The formed reduced graphene oxide layer was taken out of the hydriodic acid solution, washed with distilled water and dried at room temperature to form a heat shrink layer-reduced graphene oxide layer. It was found that the reduced graphene oxide layer was about 100 nm in thickness, the reduced graphene oxide sheet of the layer was 1 to 4 nm in thickness, and an interlayer spacing between reduced graphene oxide sheets was about 0.3 to 0.4 nm.

The interlayer spacing between the reduced graphene oxide sheets, the thickness of the reduced graphene oxide layer, and the thickness of the reduced graphene oxide sheet were measured by the same method as the above-described example 1.

A polypropylene film (YoulChon Chemical) corresponding to a sealant layer was formed on the formed reduced graphene oxide layer using a lamination method. Accordingly, the heat shrink layer-reduced graphene oxide layer-sealant layer was in the shape of a tube.

Except that the heat shrink layer-reduced graphene oxide layer-sealant layer was used, a packaging for a flexible secondary battery and a flexible secondary battery in which the packaging for a flexible secondary battery is in a shape of a tube that is wrapped around the outer surface of the electrode assembly of the flexible secondary battery were obtained by the same method as example 1.

Example 3

A mechanical support layer-reduced graphene oxide layer was obtained by the method described in example 1.

A heat shrinkable tube (YoulChon Chemical, a modified polyvinylidene fluoride tube) as a heat shrink layer was applied to the outer side of the mechanical support layer-reduced graphene oxide layer by lamination. In this instance, the surface of the reduced graphene oxide layer was modified by oxidation through UVO treatment so that surface energy of the heat shrink layer and surface energy of the reduced graphene oxide were equal. The contact angle of a water drop was used to determine whether or not the surface energy of the heat shrink layer and the surface energy of the reduced graphene oxide layer are equal.

Subsequently, except that a polypropylene film (YoulChon Chemical) as a sealant layer was applied to the inner side of the heat shrink layer by lamination, a packaging for a flexible secondary battery and a flexible secondary battery in which the packaging for a flexible secondary battery is in a shape of a tube that is wrapped around the outer surface of the electrode assembly of the flexible secondary battery were obtained by the same method as example 1.

Comparative Example 1

A packaging for a flexible secondary battery and a flexible secondary battery were manufactured by the same method as example 1 except that $CuCl_2$ was not added to the dispersion composition when forming a reduced graphene oxide layer. It was found that the reduced graphene oxide layer was about 100 nm in thickness, the graphene oxide sheet of the layer was 1 to 4 nm in thickness, and the formed reduced graphene oxide layer had an interlayer spacing of about 0.3 to 0.4 nm.

Comparative Example 2

Except that a polyethylene terephthalate (PET) film (LAMI-ACE, a laminating film) was used instead of the mechanical support layer-reduced graphene oxide layer-heat shrink layer-sealant layer, a packaging for a flexible secondary battery and a flexible secondary battery in which the packaging for a flexible secondary battery is in a shape of a tube that is wrapped around the outer surface of the electrode assembly of the flexible secondary battery were obtained by the same method as example 1.

Comparative Example 3

Except that a stack film obtained by stacking a polypropylene film as a sealant layer on one surface of a polyethylene terephthalate (PET) film (LAMI-ACE, a laminating film) by lamination was used instead of the mechanical support layer-reduced graphene oxide layer-heat shrink layer-sealant layer, a packaging for a flexible secondary battery and a flexible secondary battery in which the packaging for a flexible secondary battery is in a shape of a tube that is wrapped around the outer surface of the electrode assembly of the flexible secondary battery were obtained by the same method as example 1.

Evaluation 1: Measurement of Vapor Barrier Property

To measure the vapor barrier property, each film manufactured in example 1 and comparative examples 1 and 2 was prepared 10×10 cm in size, tailored and mounted in a water vapor transmission rate tester (Sejin Test, Model: SJTM-014). Subsequently, dry nitrogen gas containing no water vapor was introduced into one surface of the packaging for a flexible secondary battery, and water vapor was introduced into the other surface. In this instance, to prevent gases introduced into the two surfaces of the packaging for a flexible secondary battery from being mixed with each other, two spaces in which the gases flow were isolated from each other. Meanwhile, during the test, the temperature was set to 38° C., and the humidity was set to 100% RH, and these conditions were maintained. Additionally, an amount of water vapor on the one surface in which dry nitrogen gas flows was measured for 24 hours using a humidity sensor. An amount of water vapor per unit area penetrating the pouch film for 24 hours was obtained by dividing the amount of water vapor by the area of the one surface, and this was evaluated as a water vapor transmission rate (WVTR). The results are shown in Table 1.

As a result, as presented in the following Table 1, it was found that the packaging for a flexible secondary battery of example 1 had much improved water vapor transmission rate compared to each packaging for a flexible secondary battery of comparative examples 1 and 2. Through this, it can be seen that the packaging for a flexible secondary battery with electrostatic interaction of the reduced graphene oxide sheets of the reduced graphene oxide layer shows more effective vapor barrier than the packaging for a flexible secondary battery with no electrostatic interaction.

TABLE 1

| | Example 1 | Comparative example 1 | Comparative example 2 |
|---|---|---|---|
| WVTR ($g/m^2$/day) | $9.2 \times 10^{-3}$ | $1.38 \times 10^{-1}$ | 3.0 |

Evaluation 2: Measurement of Battery Performance

For each flexible secondary battery manufactured in example 1 and comparative example 3, a charge/discharge test was performed at the current density of 0.3 C in the voltage condition between 2.5 V to 4.2 V for 50 cycles. As a result, it was found that the capacity retention of the flexible secondary battery of example 1 after 50 cycles was 95%, whereas the capacity retention of the flexible secondary battery of comparative example 3 after 50 cycles was 5%, and thus the capacity retention of the flexible secondary battery manufactured in example 1 was much better.

What is claimed is:

1. A packaging for a flexible secondary battery configured to be disposed around an outer surface of an electrode assembly of the flexible secondary battery, the packaging comprising:

a heat shrink layer;

a reduced graphene oxide layer disposed on the heat shrink layer, the reduced graphene oxide layer including a plurality of reduced graphene oxide sheets and metal cations; and a sealant layer disposed on the reduced graphene oxide layer, wherein the plurality of reduced graphene oxide sheets in the reduced graphene oxide layer forms electrostatic interactions between adjacent sheets of the plurality of reduced graphene oxide sheets via the metal cations, wherein each sheet of the plurality of reduced graphene oxide sheets has a structure of one to three layers of reduced graphene oxide particles and a thickness ranging from 1 nm to 10 μm, wherein the reduced graphene oxide layer has a thickness ranging from 100 nm to 100 μm, and wherein the metal cations include at least one of $Li^+$, $K^+$, $Mg^{2+}$, $Ca^{2+}$, $Pb^{2+}$, $Co^{2+}$, $Al^{3+}$, $Cr^{3+}$, or $Fe^{3+}$.

2. The packaging for a flexible secondary battery according to claim 1, wherein each sheet of the plurality of reduced graphene oxide sheets has a thickness ranging from 0.002 to 10 μm.

3. The packaging for a flexible secondary battery according to claim 1, further comprising:

an adhesive layer between any two adjacent layers among the heat shrink layer, the reduced graphene oxide layer, and the sealant layer.

4. The packaging for a flexible secondary battery according to claim 1, wherein the heat shrink layer is surface modified.

5. The packaging for a flexible secondary battery according to claim 1, wherein the metal cations further include at least one of $Ag^+$ or $Cu^{2+}$.

6. The packaging for a flexible secondary battery according to claim 1, wherein the packaging has a water vapor transmission rate of about $9.2\times10^{-3}$ $g/m^2$/day.

7. The packaging for a flexible secondary battery according to claim 6, wherein the water vapor transmission rate is determined as follows:

preparing a sample having a size of 10×10 cm;

mounting the sample in a water vapor transmission rate tester;

introducing a dry nitrogen gas containing no water vapor to a first surface of the sample, and introducing water vapor to a second surface of the sample, the first surface and the second surface being isolated from each other, wherein a temperature of 38° C. and a humidity of 100% RH are maintained for a period of 24 hours;

determining an amount of water vapor on the first surface in which the dry nitrogen gas flows was measured for 24 hours using a humidity sensor; and obtaining an amount of water vapor per unit area penetrating the sample for 24 hours by dividing the amount of water vapor by an area of the first surface.

8. The packaging for a flexible secondary battery according to claim 1, wherein the reduced graphene oxide particles include a plurality of oxygen functional groups disposed at an edge of the reduced graphene oxide particles, and wherein adjacent sheets of the plurality of reduced graphene oxide sheets have an interlayer spacing ranging from 0.7 nm to 5.0 nm.

9. A method for manufacturing the packaging for a flexible secondary battery of claim 1, the method comprising:

preparing a mechanical support layer;

coating a dispersion composition in which graphene oxide particles and a metal salt are dispersed on the mechanical support layer, and drying to form a graphene oxide layer;

reducing the graphene oxide layer to form a reduced graphene oxide layer;

forming a heat shrink layer on the reduced graphene oxide layer;

forming a sealant layer on the heat shrink layer; and wrapping the packaging around an outer surface of an electrode assembly of a flexible secondary battery such that the sealant layer is in contact with the outer surface of the electrode assembly of the flexible secondary battery.

10. The method for manufacturing the packaging for a flexible secondary battery according to claim 9, wherein the step of reducing the graphene oxide layer is carried out using hydriodic acid or vitamin C.

11. A flexible secondary battery comprising:

an electrode assembly including an inner electrode, a separation layer formed around the inner electrode, and an outer electrode formed around an outer surface of the separation layer; and the packaging according to claim 1 disposed around an outer surface of the electrode assembly.

12. A flexible secondary battery comprising:

an electrode assembly including an inner electrode, a separation layer formed around the inner electrode, and an outer electrode formed around an outer surface of the separation layer; and the packaging according to claim 1 disposed around an outer surface of the electrode assembly.

* * * * *